Dec. 19, 1967

G. S. KNOX ET AL 3,359,013

DEEP WELL CASING JOINT

Filed Sept. 3, 1965

INVENTORS.
GRANVILLE S. KNOX
MELVIN D. MACARTHUR
By White & Haefliger
ATTORNEYS.

United States Patent Office 3,359,013
Patented Dec. 19, 1967

3,359,013
DEEP WELL CASING JOINT
Granville S. Knox, Fallbrook, and Melvin D. MacArthur, Glendale, Calif., assignors to Hydril Company, Los Angeles, Calif., a corporation of Ohio
Filed Sept. 3, 1965, Ser. No. 484,953
4 Claims. (Cl. 285—13)

ABSTRACT OF THE DISCLOSURE

The disclosed well casing joint incorporates load transfer shoulders and sealing shoulders on thread connected pin and box members, with construction such that the load transfer shoulders provide the torque strength needed upon make-up of the joint; and the sealing shoulders provide a self-energizing seal in response to external fluid pressure application. Also, the shoulders provide for relieving of excessive internal fluid pressure application to prevent rupture of the box member.

---

This invention relates generally to improvements in well pipe joints, and more particularly has to do with the construction of screw threaded casing joints characterized as employing metal-to-metal seals.

The developments in oil well casing and casing joints have followed a certain pattern prescribed by needs. In general, the limited space down hole critically limits the size of the joint so that great ingenuity is required in defining suitable joints in somewhat inadequate size. In limited sections, a tapered thread (or stepped thread) is required and normal for achieving sufficient tension strength.

Tapering of the threaded section is so advantageous that many types of commercial casing joints are now commonplace in the oil fields. But, taper necessarily makes the distal ends of the pin and box thin. This means a thin and inherently insufficient box shoulder must, somehow, be made into an adequate torque shoulder and also into an adequate pressure sealing shoulder. For torque strength, the box shoulder is made square, or nearly square, providing compression strength during application of torque. On the other hand, as an internal pressure seal, the thin box section is drastically limited in pressure performance by its very thinness; and as an external pressure seal, the blunt shape of the box shoulder is not compatible with a self energizing sealing action. This invention proposes to solve these two dilemmas.

It is a major object of the present invention to provide a solution to the above problems, and which turns out to be unusually efficient, simple, useful and beneficial. Basically, the invention involves providing the box member forward terminal with inner and outer annular portions, the pin member and the box member outer annular portion having load transfer shoulders interfitting along a first and generally frusto-conical locus tapering forwardly and inwardly, and the pin member and the box member inner annular portion having sealing shoulders interfitting along a second generally frusto-conical locus tapering rearwardly and inwardly. The construction is such that the load transfer shoulders provide the torque strength needed upon make-up of the joint, and the sealing shoulders provide a self-energizing seal in response to external fluid pressure application.

As a modified form of the invention, the shoulders may also provide for relieving of excessive internal fluid pressure application to prevent rupture of the box member. The sealing shoulders are placed and oriented so as to effect automatic relief in response to outward resilient bowing or flexing of the box member induced by excessive internal fluid pressure application to the bore of the box member, as for example along the thread locus. In this aspect of the invention, a local clearance path is provided for fluid pressure to leak between the load transfer shoulders without mitigating the mechanical load transfer capability thereof. Accordingly, the joint is characterized by unusual structure, function and results.

These and other objects and advantages of the invention, as well as the details of illustrative embodiments, will be more fully understood from the following detailed description of the drawings in which.

Figure 1:
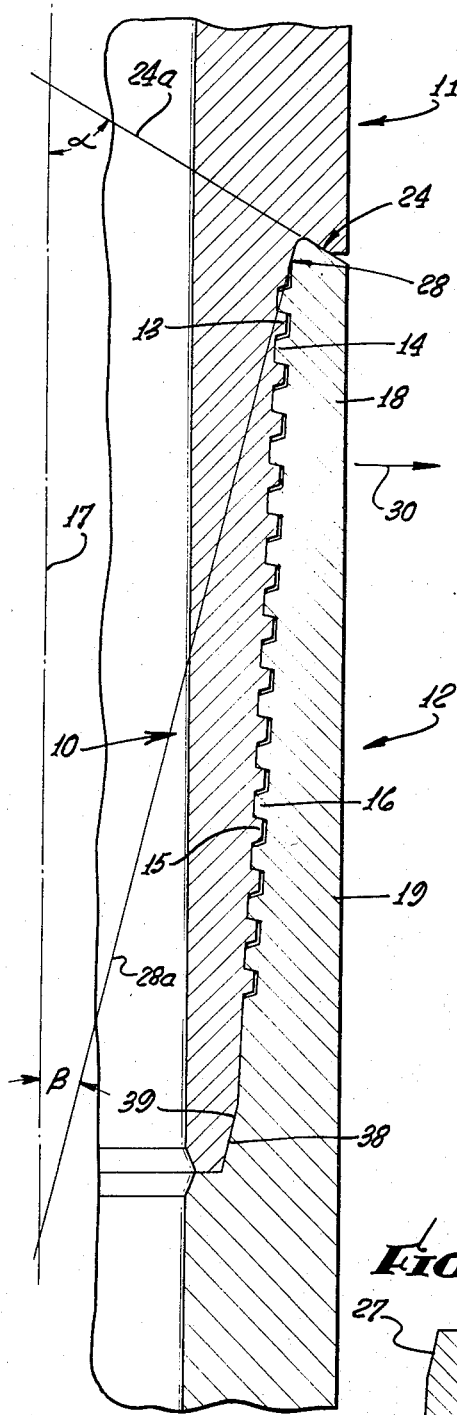
FIG. 1 is a vertical half-section taken through one form of made-up joint incorporating the invention.

Referring first to FIG. 1, the casing joint 10 therein shown includes a pin member 11 and box member 12 having interengaged threads 13 and 14 which taper as shown. The thread section that includes threads 13 and 14 closest to the box terminal is spaced further from the joint axis 17 than the thread section that includes threads 15 and 16. As a result, the box overall radial thickness dimension at box portion 18 outward of threads 13 and 14 is substantially less than the box overall radial thickness dimension at box portion 19 outward of threads 15 and 16.

Figure 2:
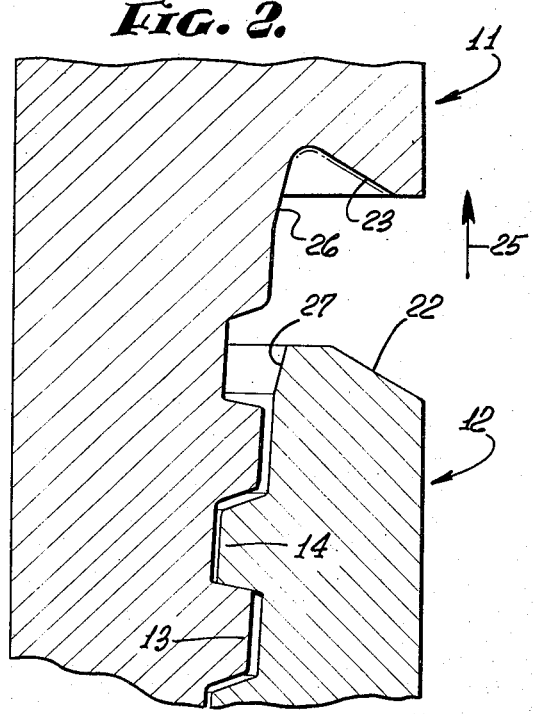
FIG. 2 is an enlarged fragmentary section taken through the FIG. 1 joint at the forward terminal of the box member, and before the joint is fully made up.
Figure 3:
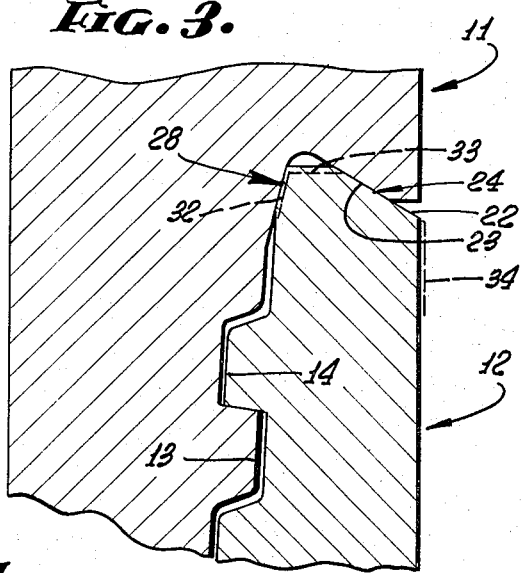
FIG. 3 is a view like FIG. 2, but showing the joint fully made up.

Extending the description to FIGS. 2 and 3, upon make-up of the joint and with application of torque, load transfer between the pin and box member occurs at interengaged shoulders 22 and 23 interfitting along a first and generally frusto-conical locus 24 tapering forwardly and inwardly, box shoulder 22 being at the outer annular portion of the box member forward terminal. Arrow 25 defines the forward direction, as seen in FIG. 2. As seen in FIG. 1, a forward extension of said locus 24 intersects an axial radial plane (of FIG. 1) along a line 24a extending at an angle $\alpha$ with respect to axis 17, that angle typically being about 60° for the structure shown.

Further, upon make-up of the joint, metal-to-metal fluid pressure seals are established at sealing shoulders 26 and 27 interfitting along a second frusto-conical locus 28 tapering rearwardly and inwardly, box shoulder 27 being at the inner annular portion of the box member forward terminal. Sealing shoulders 38 and 39 on the pin and box members are also interengaged frusto-conically proximate the rearward terminal of the pin member. As seen in FIG. 1, a rearward extension of the locus 28 intersects an axial radial plane (of FIG. 1) along a line 28a extending at an angle $\beta$ with respect to axis 17, that angle typically being about 14° for the structure shown.

As a result of the construction as described, whenever internal fluid pressure leaking past shoulder pairs 38 and 39 enters between threads 13 and 14 to build up excessively, and resiliently bulges box member annular portion 18 in an outward direction as indicated by arrow 30, the interengagement of shoulders 26 and 27 relieves sufficiently (as indicated by broken lines 32 and 33 and 34 showing retraction) to pass the high fluid pressure outwardly and past shoulders 22 and 23, (as for example through means at or in such shoulders defining a notch or out-of-round therebetween). Therefore the joint's internal pressure sealing performance at seal 28 is limited to approximate the strength of section 18.

In the event of extreme external fluid pressure application, shoulders 26 and 27 are self-energizing to increase the sealing effect stopping leakage of external fluid pressure therebetween without limit.

Figure 4:
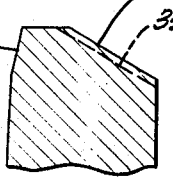
FIG. 4 is a fragmentary section showing the forward terminal of a modified box member.

FIG. 4 shows a local clearance notch or groove 35 formed across the shoulder 22 in an outward direction to provide a passage way for fluid outwardly escape from the joint after relief past shoulders 26 and 27 as described above. A similarly functioning notch or groove could be provided on shoulder 23 (in place of 35 on 22).

We claim:
1. In a well casing joint, pin and box members having a common longitudinally extending central axis, said pin and box members having interfitting threads between which fluid under pressure from the joint interior may pass, the box member having a forward terminal end with radially inner and outer annular portions, the pin member and said radially outer annular portion having load transfer shoulders interfitting along a radially outer generally frusto-conical locus tapering forwardly and radially inwardly, the pin member and said radially inner annular portion having sealing shoulders sealingly interfitting along an inner radially generally frusto-conical locus tapering rearwardly and radially inwardly, and said pin member and radially outer annular portion having means therein defining a local clearance path for fluid under pressure to leak between said load transfer shoulders, said interfitting threads and both of said shoulders being so constructed and arranged that if the fluid within said members approaches a pressure which would rupture said box member, the fluid under pressure will escape past the interfitting threads, sealing surfaces and load transfer shoulders and out through said clearance path thereby relieving the excessive pressure on the fluid.

2. The combination of claim 1 in which said load transfer shoulders are inclined at an angle of about 60 degrees with respect to said axis.

3. The combination of claim 1 in which said sealing shoulders are inclined at about 14 degrees with respect to said axis.

4. The combination of claim 1 in which said threads closer to said box terminal end are spaced radially further from said axis than the threads further from said box terminal end.

References Cited
UNITED STATES PATENTS

| | | | |
|---|---|---|---|
| 1,849,066 | 3/1932 | Bridges | 285—390 X |
| 3,181,895 | 5/1965 | Cator | 285—1 |

FOREIGN PATENTS

| | | |
|---|---|---|
| 1,300,262 | 5/1962 | France. |
| 838,434 | 5/1952 | Germany. |
| 496,085 | 9/1952 | Italy. |

CARL W. TOMLIN, *Primary Examiner.*

DAVE W. AROLA, *Assistant Examiner.*